United States Patent Office 3,518,672
Patented June 30, 1970

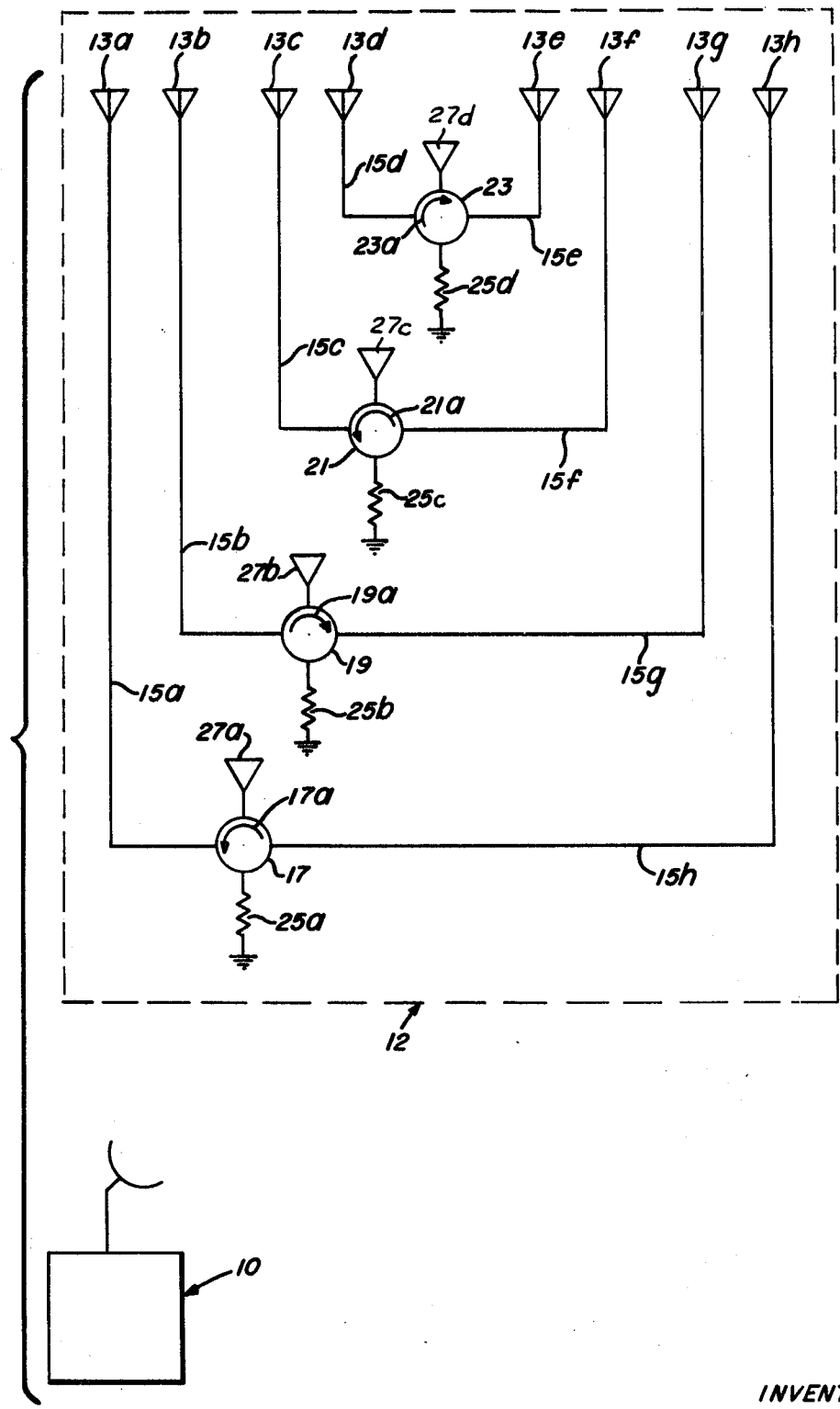

---

3,518,672
RADAR TRANSPONDER
John T. Zimmer, Harvard, Mass., assignor to Raytheon Company, Lexington, Mass., a corporation of Delaware
Filed Feb. 28, 1969, Ser. No. 803,268
Int. Cl. H01q 1/00, 1/28
U.S. Cl. 343—100      1 Claim

ABSTRACT OF THE DISCLOSURE

A radar transponder system utilizing an active radar beacon and a retrodirective antenna in which interrogating signals are received by such beacon, amplified and reradiated in a beam which is always directed back to the source of the interrogating signals. The amplifier in the radar beacon is so disposed that interfering signals generated within the radar beacon are damped to prevent ripples or unwanted oscillations in the reradiated signals.

---

The invention herein described was made in the course of or under a contract or subcontract thereunder, with the Department of Defense.

BACKGROUND OF THE INVENTION

This invention pertains generally to radar transponder systems and particularly to systems of such type which utilize a retrodirective antenna and an amplifier to amplify and reradiate interrogating signals.

It is known in the art that planar waves of radio frequency energy, as the waves propagated in a collimated beam from a radar set, may be received by certain types of antenna arrays and then, by reason only of special characteristics of the particular receiving array, reradiated back to the radar set in a collimated beam. Antenna arrays having such a capability are said in the art to be "retrodirective" arrays.

The so-called Van Atta antenna array is one of the presently known retrodirective arrays. Such arrays have particular value when used in radar transponder systems of various types. Thus, such arrays have been used in "passive" systems, meaning systems in which radio frequency energy from a radar set is simply retrodirected, and in "active" systems, meaning systems in which radio frequency energy from a radar set is received, amplified and then retrodirected.

In its simplest form as used in a passive system, the Van Atta antenna array ideally includes at least two pairs of omnidirectional transmit/receive antennas spaced one from the other with each pair connected by a radio frequency transmission line of predetermined length. Radio frequency energy from a remote source impinging on the first one of such antennas is passed through the radio frequency transmission line and reradiated from the second one of such antennas and vice versa. By proper selection of the spacing of the two antennas and the length of the connecting transmission line, it is possible then to cause constructive interference between the two reradiated fields in a plane which includes a line between the center point between the antennas and the source of the received energy. The simplest form of the Van Atta antenna array as used in an active system is the same as just described with the addition of two radio frequency amplifiers, or a single "bidirectional" amplifier, disposed in a circuit with the transmission line so that one amplifier amplifies signals received by the first one of the antennas before such signals are passed to the second one of the antennas for reradiation and the other amplifier amplifies signals received by the second one of the antennas before such signals are passed to the first one of the antennas for reradiation. In both passive and active systems it is the usual practice to incorporate additional pairs of antennas (and other elements appropriate to the particular system as just noted) taking care that the effect of the energy reradiated from any such added pairs of antennas only increases the directivity of the reradiated energy.

When a Van Atta antenna array is used in a practical active system, the ideal condtions assumed hereinbefore are modified by unavoidable anomalies in the required circuitry. That is, because it is not now possible to construct a practical radio frequency circuit of this nature in which the elements are perfectly matched to each other, internally reflected signals are always, to a lesser or greater degree, present. Such signals add or subtract to the amplified signals causing, at best, undesired ripples therein or, at worst, uncontrolled oscillations in the reradiated signals.

Therefore, it is a primary object of this invention to provide an improved active radar transponder using a retrodirective antenna array;

Another object of this invention is to provide an improved active radar transponder wherein internally reflected signals have little effect on such transponder's performance; and, Still another object of this invention is to provide an improved active radar transponder wherein the foregoing objects of this invention are attained utilizing standard components.

SUMMARY OF THE INVENTION

These and other objects of this invention are attained generally by using a modified form of a Van Atta antenna array in an active radar transponder, the circuitry between each conjugate pair of antennas in the contemplated form being arranged so that one of the antennas in each pair is a receiving antenna only and the other one is a transmitting antenna only.

BRIEF DESCRIPTION OF THE DRAWING

For a more complete understanding of this invention reference is now made to the drawing, the single figure shows, in block form, a preferred embodiment of a radar transponder system according to the concepts of this invention.

DESCRIPTION OF THE PREFERRED EMBODIMENT

Referring now to the figure, it may be seen that an active radar transponder according to this invention includes a radar set 10 and a radar beacon 12. The radar set 10 is here shown in block form because any known radar set may be used. The radar beacon 12, is of course, normally mounted on a moving vehicle (not shown). According to this invention the radar beacon 12 includes a plurality of antennas 13a, 13b, 13c, 13d, 13e, 13f, 13g and 13h connected through transmission lines 15a, 15b, 15c, 15d, 15e, 15f, 15g and 15h and hybrid junctions 17, 19, 21 and 23 so that, ultimately, a conductive path for radio frequency energy is provided from the receiving antenna to the transmitting antenna of each pair but no such path is provided in the reverse direction.

In the illustrated case, then, antennas 13a and 13h are considered to be a conjugate pair and antennas 13b and 13g are another such pair. Similarly, antennas 13c and 13f and antennas 13d and 13e each make up a conjugate pair.

The hybrid junctions 17, 19, 21 and 23 are similar in construction one to the other, each being a conventional four-port junction commonly called a circulator. As is known, a device of this type may be arranged to direct radio frequency energy from an input port to a selected output port, the output port being automatically selected in accordance with the direction of the radio frequency energy applied. This characteristic is indicated by the arrows 17a, 19a, 21a and 23a in each corresponding hybrid junction 17, 19, 21 and 23. Taking hybrid junction 17 and the arrow 17a therein as an example, the arrow indicates that radio frequency energy entering the hybrid junction over the transmission line 15a would be directed to the lower junction of the hybrid junction 17 while radio frequency energy entering the hybrid junction 17 over the transmission line 15h would be directed to the upper port. The lower port of the hybrid junction 17 is connected through an absorptive load 25a of conventional construction, to ground while the upper port of the hybrid junction 17 is connected to a radio frequency amplifier hereinafter referred to as an amplifier 27a. It should be noted that, as shown, amplifier 27a is a "reflective" amplifier, meaning an amplifier having a common input and output terminal, as a tunnel diode amplifier of known construction. The other hybrid junctions 19, 21 and 23 are similarly connected to absorptive loads and amplifiers as shown. It should be noted here that a particular type of absorptive loads 25a through 25d or amplifiers 27a through 27d which are incorporated in the illustrated circuit is not essential to the invention, any known absorptive load or amplifier operative in the radio frequency path being satisfactory.

The operation of the disclosed circuit will now be explained. Referring to antenna pairs 13a and 13h and the circuitry connecting the two it may be seen that when the antennas are irradiated by radio frequency energy from the radar set 10 the energy received by antenna 13a passes over transmission line 15a to the hybrid junction 17 and then through the absorptive load 25a and then is dissipated in the absorptive load 25a. Radio frequency energy received by antenna 13h, on the other hand, passes through the hybrid junction 17 over transmission line 15h, is directed therefrom to the amplifier 27a and, after amplification, is returned to the hybrid junction 17 and directed into the transmission line 15a, finally appearing at antenna 13a. It is evident from the foregoing that any of the amplified signals in the transmission line 15a which may, for any reason, be reflected back to the hybrid junction 17 appears to that element to be the same as radio frequency energy originally received by the antenna 13a. Any such reflected energy, therefore, is directed to the absorptive load 25a and is therein dissipated. Referring now to antenna pair 13b and 13g and the circuitry connecting them it may be seen that such circuitry is identical to that described in connection with antenna pair 13a and 13h except that the direction in which radio frequency incident on the hybrid junction 19 is directed is opposite to that of hybrid junction 17. In other words, hybrid junction 19 is controlled so that radio frequency energy received over transmission line 15g is directed to the absorptive load 25b and therein dissipated while radio frequency energy coming to the hybrid junction 19 over the transmisison line 15b is amplified in the amplifier 27b and then passed over the line 15g to antenna 13g. A moment's thought then will make it clear that the four antennas 13a, 13b, 13g and 13h are equivalent to a single pair of antennas in a conventional Van Atta array. Similarly, it may be seen that antenna pairs 13c, 13d, 13e and 13f are the equivalent of another pair of antennas in a conventional Van Atta array. Consequently, by properly spacing the individual antennas and maintaining the electrical lengths of the various transmission paths as in a conventional Van Atta array, a retrodirective beam is reradiated. It may also be seen that, because each of the amplifiers 27a, 27b, 27c, 27d is isolated from unwanted reflected signals (which are dissipated in the absorptive loads 25a, 25b, 25c, 25d), a major cause of ripple or uncontrollable oscillations is not present in the contemplated arrangement. It follows, then that the power reradiated from each transmitting antenna in an array of the type here contemplated may be increased beyond the maximum possible in a conventional active Van Atta array. Such increase in reradiated power, naturally, increases the maximum range from which a useful signal may be sent back to an interrogating radar set. Any increase in maximum usable range is desirable from a technical point of view; when, as here may be easily shown, the cost of the equipment required to attain such a result is less using the concepts herein disclosed than the cost of equipment using heretofore known techniques, then an economic advantage is also to be gained.

While the described embodiment of this invention is useful to an understanding thereof, it will be immediately apparent to those having skill in the art that utilization of the concept of conjugate antennas and unidirectional amplifiers does not require that a retrodirective antenna array in an active radar transponder system be exactly as shown and described. For example, the illustrated arrangement of conjugate antennas wherein alternate ones are receiving and transmitting elements may be changed to have all the antennas on one side of the array receiving antennas and all the elements on the other side of the array transmitting antennas. Another change which falls within the concepts of the invention is to eliminate the hybrid junction and to change the position of the amplifier in the circuit to put that element in series with the transmission line. The amplifier used in this instance would, of course, be of the type having separate input and output terminals. It is felt, therefore, that the invention should not be restricted to its disclosed embodiment but rather should be limited only by the terms of the following claims.

What is claimed is:
1. A transponder wherein interrogating signals from a radar set are received, amplified and retransmitted back to the radar set, such transponder comprising:
 (a) an antenna array, such array including a plurality of conjugate pairs of antenna elements;
 (b) radio frequency circuit means connecting the antenna elements of each one of the conjugate pairs thereof, each such means being disposed to shift, by a constant amount, the phase of interrogating signals passing from one of the antenna elements to the other, each such means including:
  (i) a four port circulator having a first and a second input terminal and a first and a second intermediate terminal;
  (ii) radio frequency transmission lines connecting, respectively, the first input terminal to one of the antenna elements and the second input terminal to the other of the antenna elements;
  (iii) unidirectional amplifier means connected to the first intermediate terminal; and
  (iv) a matched load connected to the second intermediate terminal.

References Cited

UNITED STATES PATENTS

| 2,908,002 | 10/1959 | Van Atta. | |
| 3,196,438 | 7/1965 | Kompfner | 343—100 |
| 3,267,462 | 8/1966 | Gabriel | 343—6.8 |
| 3,314,067 | 4/1967 | Rutz. | |
| 3,340,530 | 9/1967 | Sullivan et al. | 343—100 |
| 3,441,935 | 4/1969 | Leitner | 343—701 |

RODNEY D. BENNETT, Jr., Primary Examiner

M. F. HUBLER, Assistant Examiner

U.S. Cl. X.R.
343—701, 705